Nov. 24, 1964
F. PETKOVICH ETAL
3,158,463
AGGLOMERATION OF ORES
Filed Feb. 17, 1961
2 Sheets-Sheet 1
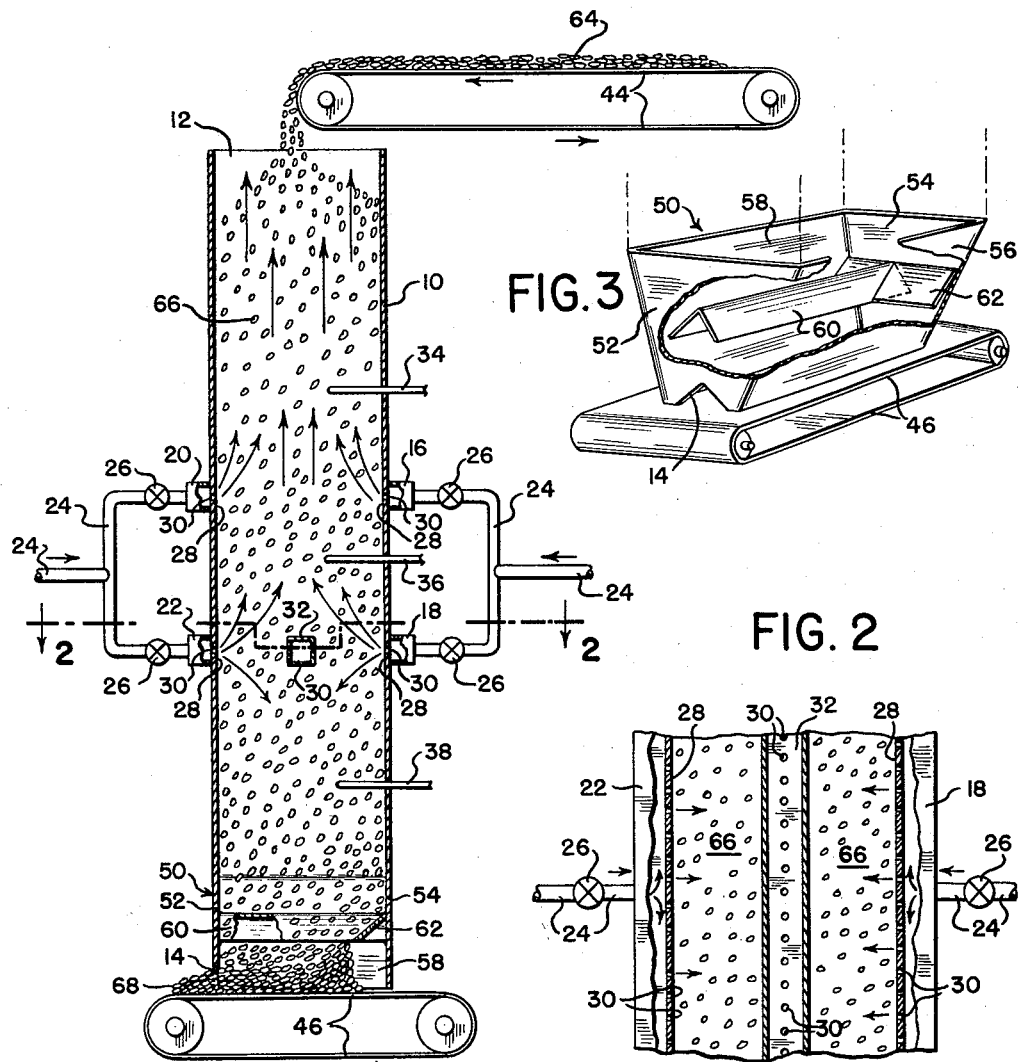
INVENTORS
FRANK PETKOVICH
PAUL EWALD CARROLL
BY
ATTORNEYS Nov. 24, 1964

F. PETKOVICH ETAL 3,158,463

AGGLOMERATION OF ORES

Filed Feb. 17, 1961

United States Patent Office 3,158,463
Patented Nov. 24, 1964

3,158,463
AGGLOMERATION OF ORES
Frank Petkovich, Onaping, Ontario, and Paul Ewald Carroll, Falconbridge, Ontario, Canada, assignors to Falconbridge Nickel Mines Limited
Filed Feb. 17, 1961, Ser. No. 89,957
4 Claims. (Cl. 75—5)

This invention relates to agglomeration of ores and has for its object improvements in the method of and apparatus for agglomerating ores.

The present invention contemplates the agglomeration of finely divided ores or concentrates containing sulphide minerals capable of undergoing oxidation reactions at temperatures below incandescence. An object of the invention is to oxidize green agglomerates of such concentrates, to control the oxidation so as to result in a sub-incandescent temperature, and thus to prevent the sintering together of the agglomerates. A further object is to make use of the exothermic heat resulting from such sub-incandescent oxidation to assist in the removal of the water normally occurring in the concentrates produced in the form of filter cake. A still further object is to control the oxidation in such a way as to cause the formation of oxidation products in situ, capable of acting as intergranular binders, and thus resulting in hardened, dry agglomerates of the concentrates. In other words, the object of the present invention is to dry and indurate green agglomerates of metal sulphide concentrates without the addition of either extraneous binders or fuels.

In the customary present practice, the preparation of finely divided ores and concentrates for blast furnace smelting necessitates agglomeration of the fine material either by sintering or by pelletizing or briquetting with separately added binding materials. Sintering, which takes place at incandescent temperatures, requires special equipment designed to withstand high temperatures, and also results in a high temperature product which is inconvenient to handle. On the other hand, the conventional binding agents necessary to the hardening of the pellets or briquettes are not only costly but also difficult to distribute in the concentrate mixture. Moreover, drying and curing of the green agglomerates requires considerable amounts of externally added heat.

As a result of our investigations, we have found that green agglomerates, such as pellets or briquettes, of certain metal sulphide flotation concentrates can be dried and indurated at temperatures well below incandescence by treatment in an open-ended vertical chamber with the addition of no fuel or other reagents except air.

Our present method is to establish a column of the agglomerates in a vertical chamber, to feed green agglomerates to the top of the column at a predetermined rate and to withdraw agglomerates from the bottom of the column at the same rate while passing air or other oxygen-bearing gas upwardly through the column. For the purpose of the present description, the term green agglomerates refers to damp, compacted, masses of particles bonded chiefly by moisture and having sufficient green strength to permit normal handling without undue breakage or degradation. The air, in passing through the column of agglomerates, reacts exothermically with their contained sulphides to form solid and gaseous oxidation products. The solid products, such as oxides and sulfates, are formed on the surfaces of the sulphide particles, and act as intergranular bonding agents within the body of each agglomerate. The gaseous oxidation products, such as sulphur dioxide and sulphur trioxide, are absorbed or adsorbed, or both, for the greater part by the green agglomerates in the upper part of the column, and thus also remain in the agglomerates and contribute to the formation of the intergranular bonding agents. The oxidation reactions result in the release of considerable heat which raises the temperature of the column and of the gases passing through it. This heat vaporizes moisture from the agglomerates as they slowly descend the vertical chamber, and the moisture so vaporized is carried out by the heated gases.

The air or other oxidizing gas may be passed into the column by introducing it through manifolds or tuyeres entering the walls of the chamber, or it may be permitted to enter through the agglomerate discharge opening at the bottom of the chamber, or both. In the former instance the air can be fed under pressure, and the product gases can be exhausted at atmospheric pressure, while in the latter case the air enters at atmospheric pressure and is exhausted at a sub-atmospheric pressure. In either case it is necessary that means be provided for regulating the amount of air admitted to the bed.

These and other features of the invention may be better understood, it is believed, by referring to the accompanying drawing, taken in conjunction with the following description, in which FIG. 1 is a diagrammatic vertical sectional view of an apparatus, filled with agglomerates, illustrative of a practice of the invention;

FIG. 2 is a section on the line 2—2 of FIG. 1; and

FIG. 3 is a perspective view of the lower portion of the apparatus, unfilled with agglomerates, with broken away portions to show certain interior structural features of the apparatus.

Figure 4:
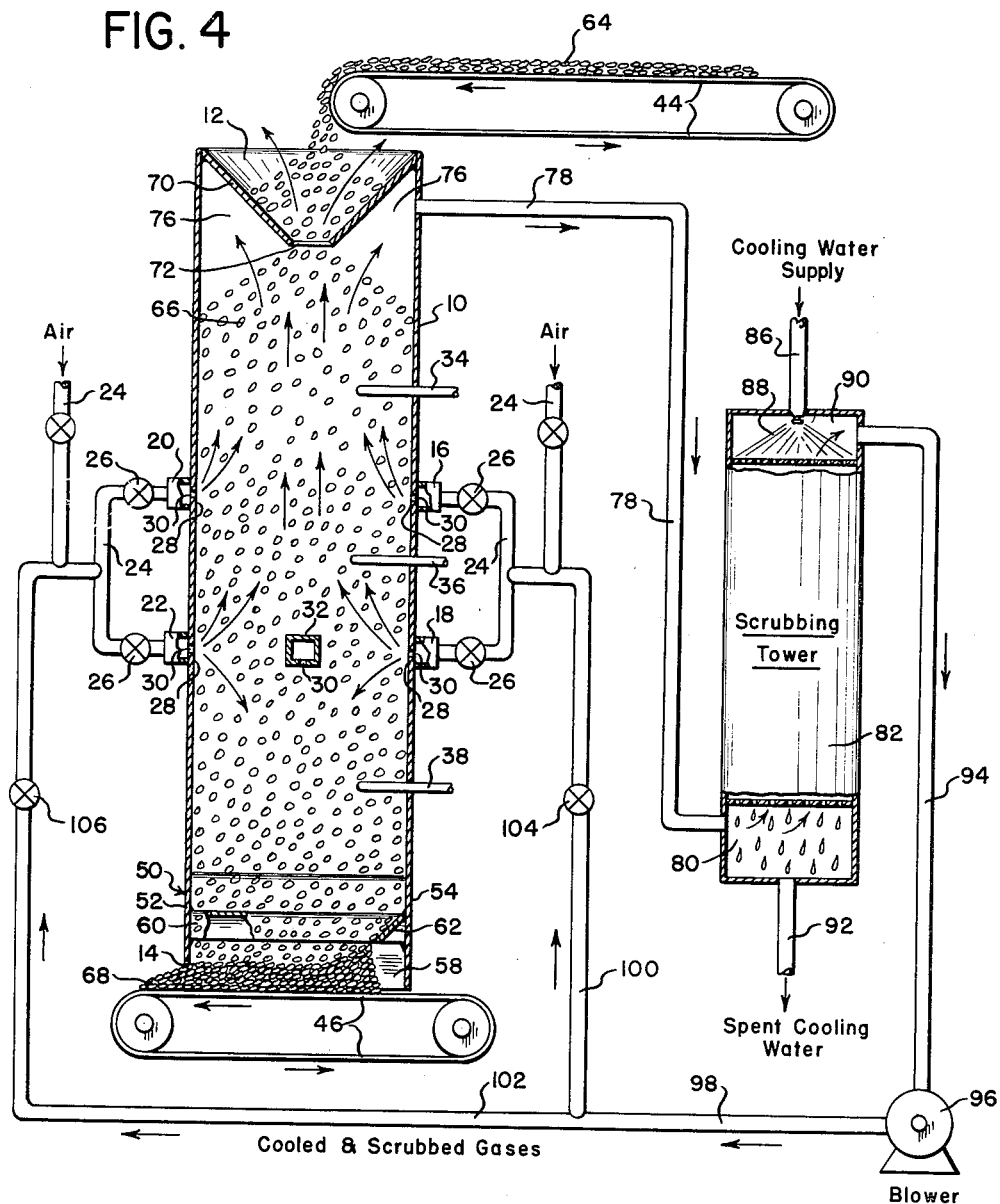
FIG. 4 is a diagrammatic vertical section of a modified form of apparatus.

Referring first to FIG. 1, the apparatus shown includes a vertical chamber 10 provided with a feed opening 12 at its upper end, a discharge opening 14 at its lower end, and a plurality of horizontally spaced exterior air inlet manifolds 16, 18, 20 and 22. FIG. 2 shows the air inlet manifolds 18 and 22 in plan view. Each air inlet manifold is provided with an air inlet pipe 24, a regulating valve 26, and an air distribution wall 28 having spaced holes 30 for the passage and distribution of air into chamber 10. The chamber is also provided with an interior manifold 32, having similarly spaced holes or vents 30, located in the lower portion of the manifold to prevent ingress of fines from the chamber. This manifold is connected likewise with valved pipes to a source of compressed air, not shown. The chamber is also equipped with thermocouples or thermometers 34, 36, 38. In a presently preferred modification the apparatus (FIG. 1) also includes an endless feed belt 44 at the top of the chamber, as shown, for feeding green agglomerates into feed opening 12 at the top of the chamber, and an endless discharge belt 46, as shown, for discharging treated agglomerates from discharge opening 14.

As shown in FIGS. 3 and 1, the lower portion of the chamber terminates in a discharge hopper 50. It is defined by a front end wall 52, a back end wall 54, and side walls 56 and 58. As shown more particularly in FIG. 1, end walls 52 and 54 are disposed vertically and terminate directly above discharge belt 46. As shown in FIG. 3, side walls 56 and 58 are tapered toward the midportion of discharge belt 46. It will be noted that front end wall 52 terminates in its midportion in an inverted V-opening, which is the discharge opening 14 referred to above.

Both FIGS. 1 and 3 show a roof-shaped flow-divider 60. Like the chamber and hopper, it is also formed of metal, one end being integrally secured to front wall 52 and the other end being integrally secured to a back deflection plate 62. The deflection plate is in turn integrally secured to back end wall 54 and is slanted toward the midportion of the discharge hopper, as shown more particularly in FIG. 1. The agglomerate flow-divider 60 and back deflection plate 62 are spaced a suitable distance above discharge belt 46, and provide side passageways for agglomerates between the sides of the flow-divider and side walls 56 and 58 of the discharge hopper. The flow-divider, besides relieving the load on the discharge belt 46, helps to support the column of agglomerates, particularly to counteract the effects of wall friction by retarding the flow of the agglomerates in the centre of the column, thus assisting in maintaining an even flow of agglomerates through the chamber and discharge hopper onto the discharge belt. The back deflector plate counteracts a tendency of the discharge belt to withdraw solids, in this case agglomerates, preferentially from the back end of the hopper, and thus also promotes a uniform flow of agglomerates throughout the entire cross-section of the chamber.

A bed of green agglomerates 64, from a source not shown, say from a hopper, is deposited on the top of belt 44. The green agglomerates are discharged from the belt and tend to fall centrally of and into vertical chamber 10 where they form a continuous column 66 of agglomerates undergoing treatment. The agglomerates pass downwardly by gravity toward discharge opening 14 where they are deposited onto moving belt 46, as shown. The feeding of the green agglomerates to belt 44 is coordinated with the rate of treated agglomerates 68 removed as a bed from the bottom of the chamber by belt 46 so that the surface of the column of agglomerates at or near the top of the chamber remains at a substantially constant level.

Compressed air or other oxidizing gas is passed through pipes 24 and regulating valves 26 into inlet manifolds 16, 18, 20, 22 (and 32), from which it passes through holes 30 for distribution throughout the column of agglomerates 66. The air thus passing into the column of agglomerates is denoted by arrows, as shown; and, as indicated by the arrows, the greater part of the air passes upwardly through the column and out of the top opening 12 of the chamber, while only a minor portion passes downwardly, and out of discharge opening 14.

The air passing through manifolds 16, 18, 20, 22 (and 32) reacts exothermically with the agglomerates so that the gases denoted by the arrows become heated to a temperature at which the free moisture in the agglomerates is substantially completely vaporized. The reaction is initiated generally by what may be termed spontaneous combustion; although some heat may be applied externally for the purpose, if indicated. Our difficulties do not lie in the direction of initiating the reactions, but in preventing them, when unwanted. The rising gases thus become progressively more heavily laden with moisture as they pass through the column, while the agglomerates progressively lose moisture as they descend from the top of the column to the air manifold level. Similarly, the rising gases become progressively depleted in oxygen as they pass through the column, while the agglomerates become progressively enriched in solid oxidation products as they descend. The minor portion of the hot gases which descend concurrently with the agglomerates below the air inlet level also contain some moisture and gaseous oxidation products. These gases help to retain heat and permit the continuation of the chemical reactions which result in the hardening of the agglomerates. In addition, the descending gases, which are greatly depleted in oxygen, act as a seal to prevent inadvertent entry of air which might result in overheating and roasting in the lower zone of the column of agglomerates.

The amount of air or oxygen-bearing gas required depends upon the kind of minerals and the size of the particles comprising the agglomerates, the size of the agglomerates and their moisture content, and the rate at which the agglomerates are fed to the chamber.

The air or oxygen required also depends on the size and shape of the chamber, since these factors will affect the thermal efficiency of the process. In large sized chambers (see FIG. 4, to be described below), water vapour is scrubbed advantageously from spent top gases and the cooled partially dried gas is recirculated with air fed to the manifolds in order to better effect the distribution of the oxygen and to avoid localized overheating. The temperature is then controlled by regulation of the proportion of the air bled into the recirculating gas stream.

A practice of the process is illustrated by the following examples:

EXAMPLE 1

A copper-nickel flotation concentrate was found to have the following approximate mineralogical composition.

| Mineral: | Wt. percent |
|---|---|
| Chalcopyrite | 13.9 |
| Pentlandite | 20.9 |
| Pyrrhotite | 36.3 |
| Pyrite | 10.2 |
| Gangue minerals | 18.7 |
| Total | 100.0 |

Screen analysis showed that the concentrate had the following particle size distribution.

| Standard Tyler screen mesh: | Wt. percent |
|---|---|
| +48 | 0.3 |
| +65 | 0.7 |
| +100 | 1.9 |
| +150 | 3.5 |
| +200 | 12.3 |
| −200 | 81.3 |

The concentrate, produced as filter cake, was partially dried in a rotary dryer to a moisture content approximately between 6 and 7.5% $H_2O$. The partially dried concentrate was formed into green briquettes by means of a roll type briquetting press. The resulting green briquettes were pillow-shaped, having approximate dimensions 2" x 2" x 1¼".

The green briquettes were continuously fed to the top of a column of briquettes in a chamber similar to that shown in FIGURE 1, having a height of about 20 feet and a cross-sectional area of about 6 square feet, and having exterior air inlet manifolds (FIG. 1) at about 4 feet and 8 feet below the top of the chamber, respectively. Green briquettes were fed at a rate of about 1200 lbs. per hour, and hardened briquettes were withdrawn from the bottom of the chamber at a substantially similar rate in order to maintain a constant column level. Under these conditions, the average detention period for the briquettes in the chamber, or shaft, was calculated to be about 10 hours. Air was introduced into the air distribution manifolds at a rate of about 70 s.c.f.m., with about 25% entering upper manifolds 16 and 20 and about 75% entering lower manifolds 18 and 22. Although both green briquettes and air supply were fed to the chamber at substantially room temperature, and no sensible heat was added to the chamber or its contents from external sources, the temperature of the briquettes was found to undergo a progressive increase from about 25° C. at the top of the chamber to about 125° C. at the bottom. Similarly, the strength of the briquettes was found to increase progressively, while their moisture content was found to decrease from the top to the bottom of the chamber. The briquette strengths, measured by the percentage of ½" material surviving 10 revolutions in a standard coke rattler drum, and the corresponding moisture contents are given in Table I as functions of the level at which briquette samples were obtained.

Table I.—Progressive Drying and Hardening of Briquettes

| Distance from Top of Chamber | Moisture Content, Percent | Strength (Percent +½″) |
|---|---|---|
| Nil | 7.0 | 48 |
| 6′3″ | 4.5 | 44 |
| 9′11″ | 3.5 | 51 |
| 13′7″ | 2.5 | 76 |
| 17′2″ | 1.5 | 81 |
| 20′0″ | nil | 85 |

It is important to note as indicated by the analyses given in Table I that the moisture is gradually eliminated through the entire treatment period of a given briquette. We have found that too rapid elimination of moisture results in an imperfectly treated product, since the presence of moisture in the briquette appears to be necessary for continuation of the hardening reactions. Thus, if maximum benefit is to be obtained from the treatment, close control must be held over the feed rate and air rate, and hence over the temperature and detention period so that the agglomerates undergo moisture elimination during as high a proportion of their sojourn in the chamber as is practicable.

The results of experiments involving the oxidation of the individual sulphide minerals comprising the above copper-nickel concentrate show that the exothermic oxidation reactions depend primarily on the contained pyrrhotite, an iron sulphide mineral having the approximate formula $Fe_7S_8$. While the presence of intermediate gaseous products such as $SO_2$ and $SO_3$ indicate the reactions to be of a complex nature, the final solid products of the reactions appear to be limited to hydrated sulphate of iron, such as ferrous sulphate monohydrate, and elemental sulphur. Thus the dominating overall chemical reaction might best be expressed as follows:

$$Fe_7S_8 + 14O_2 + 7H_2O \rightarrow 7FeSO_4 \cdot H_2O + S$$

The intermediate products $SO_2$ and $SO_3$ are easily identifiable in samples taken from within the column, but are practically non-existent in the top gas.

EXAMPLE 2

A copper-nickel flotation concentrate was subjected to screen and chemical analysis with the following results expressed as weight percent:

| Cu | Ni | Fe | S | Gangue | Percent −200 Mesh |
|---|---|---|---|---|---|
| 5.31 | 6.66 | 41.50 | 32.15 | approx. 14%. | 75 |

As in Example 1, the concentrate was produced as a filter cake containing about 13% moisture, and which required partial drying before further treatment. The filter cake was treated in a special oil-fired rotary drum dryer-pelletizer to produce green pellets containing about 6% moisture. The green pellets were sized on a 3/16″ screen to remove fines, and fed into the top of a treatment chamber 21 feet high, 5 feet wide and 4 feet, 6 inches long, again of a design similar to that employed in the previous example, except that it was equipped with an additional air distribution manifold 32 running horizontally through the middle of the bed to improve air distribution. The internal air manifold was located 7 feet, 6 inches from the top of the chamber; the upper and lower manifolds were 6 feet, 6 inches and 10 feet from the top respectively. Green pellets were fed at the rate of 2.5 tons per hour, and the total rate of air flow to the 3 manifolds was about 100 s.c.f.m., divided so that about 40 s.c.f.m. were delivered to the internal manifold and 30 s.c.f.m. to each pair of exterior manifolds 16, 18, 20 and 22. Again, though no external heat was added to the system, the temperature of the pellets rose from 250° C. to about 100° C. as they descended the treatment chamber. The hardened pellets discharged from the bottom of the chamber were found to contain an average of 0.10% moisture, and were of such strength that they survived a series of four 4 foot drops on concrete with the production of only 5% of their weight as −4 mesh material. Such a product can be seen by those skilled in the art to be highly advantageous for use as feed in various smelting operations.

The gases emitted from the top of the bed treated in Example 2 were analyzed and found to average less than 9% oxygen on a dry basis, and less than 7% oxygen on a wet basis. In other words, the oxygen consumption efficiency was at least about 57%, even though the highest temperature in the bed did not exceed 100° C., a temperature several hundreds of degrees below that at which incandescence takes place. Consequently, there were no difficulties with sintering, or with the formation of clinker by the fusing together of pellets, so that the discharge of the hardened pellets from the chamber was effected smoothly and efficiently.

The examples given are meant only to illustrate, not to provide limitations for, the present invention. Thus the sulphides treated may be finely divided chemical precipitates, ores or concentrates obtained by any suitable method of comminution and/or concentration, such as by flotation, gravity, magnetic or any other means. Similarly, the ores or concentrates may be formed into green agglomerates by any method, such as for example balling in a balling drum or disc, pelletizing in a pelletizer-dryer, or briquetting in rolls or presses.

We have found that the upright, or vertical, chamber may be a mere metal shell; that is, it need not be lined inside with a heat insulating material, such as brick. Better to withstand adverse chemical reactions, we have found that a chamber defined by a stainless steel shell serves satisfactorily. The temperature within the hottest part of the chamber is maintained above the vaporization point of water, to eliminate substantially all of the moisture content of the agglomerates, but below incandescence of the agglomerates to avoid objectionable sintering of the agglomerates.

As pointed out, to ensure adequate hardening of the agglomerates, they should not be treated too rapidly. To this end it is advantageous to treat the agglomerates in the form of a column, upright or vertical, in a chamber sufficiently high to provide adequate detention time for the agglomerates to be thoroughly treated as they pass by gravity from the top to the bottom of the chamber. The detention time in the above examples ranged from 8 to 12 hours. The agglomerates should be sufficiently large to ensure adequate interstitial spaces between agglomerates to permit ready passage of the air and gases through the column without objectionable channeling.

As the column of agglomerates moves downwardly by gravity, the agglomerates themselves move relatively to each other. The effect of this is to cause a mild intermixing of the agglomerates. This in turn assures contact of each agglomerate with the oxygen-bearing gas and facilitates the resultant reactions that occur to harden the agglomerates. Each agglomerate gets substantially the same hardening treatment. So slow is the downward advance of the column and hence of the agglomerates that there is no undue rubbing of or attrition between the agglomerates; at least not enough to produce an objectionable amount of fines.

No provision need be made for dust carry-over. Dust carry-over is very low. This is due to the relatively low gas flow through the column of agglomerates. Also, the moist agglomerates in the upper portion of the column provide adherent surfaces for the trapping of dust particles. They cling to and become an integral part of the hardened agglomerates discharged from the bottom of the column.

Brief reference is made above to FIG. 4. As noted such a modification is particularly useful for large sized chambers. Since excess water vapour is to be scrubbed from the top spent gases and the resulting cooled gas is recirculated with air fed to the manifolds, certain structural changes are required.

Thus, still referring to FIG. 4, the top of chamber 10 is provided with a feed hopper 70 integrally secured, for example, by welding, along its top peripheral portion to the top peripheral portion of the chamber, thus providing a wide opening for receiving agglomerates 64 as they are dropped from discharge belt 46. Such an arrangement prevents escape of top spent gases from the chamber at the top peripheral portions of the chamber and the feed hopper to the open air.

Further to inhibit such escape of top spent gases, the bottom of the feed hopper terminates in a constricted opening 72 through which all of the green agglomerates 64 must pass on their way into chamber 10. The opening is sufficiently large, however, to permit passage of green agglomerates into the chamber as fast as hardened agglomerates 68 are withdrawn from the bottom of the chamber. In addition the opening is sufficiently large to permit some of the top gases to escape to the open atmosphere, as indicated by some arrows.

This structural arrangement provides a free space 76 between the feed hopper, the agglomerates and the chamber walls for the accumulation of moisture-laden top spent gases. A spent gas conduit 78 connects this space with the bottom 80 of a gas scrubber 82, advantageously of the conventional upright tower type.

A cooling water supply conduit 86 communicates with the upper portion of the gas scrubber. Water discharged from the conduit under pressure spreads out into a conical spray 88. A free upper space 90 is provided around and directly above the conical spray for the accumulation of treated spent gases. A discharge conduit 92 connects the bottom of the gas scrubber for the withdrawal of spent cooling water.

A conduit 94 connects free space 90 with the inlet side of a fan or blower 96. Another conduit 98 connects the outlet side of the fan with branch conduits 100 and 102. Branch conduit 100 is provided with a gas recirculation valve 104 and connects air inlet pipe 24, which in turn connects air inlet manifolds 16 and 18. From FIG. 2 it will be apparent that branch 100, or 102, or both, is connectable with air inlet manifold 32.

In the operation of the apparatus of FIG. 4, spent hot gases heavily laden with water vapour are trapped or accumulate temporarily in free or open space 76. Fan 96, being turned on, tends to place the spent gas-withdrawal and spent gas-treatment system under vacuum. Spent hot gases are withdrawn through conduit 78, pass into the bottom portion 80 of, and upwardly through, scrubbing tower 82 where they are met or scrubbed by counter-flowing cooling water from conduit 86 and conical spray 88. As the hot spent gases rise upwardly through the tower they are cooled and a very substantial amount of their water vapour condenses and merges with the down-coming cooling water, the mixture being discharged through conduit 92.

The thus water freed, partially dried, gases accumulate in upper space 90. Fan or blower 96 draws the cooled and scrubbed gases downwardly through conduit 94, and then forces them through conduit 98. The gases are divided into two streams, one stream passing through valved conduit 100 to air inlet manifolds 16 and 18 and the other stream passing through valved conduit 102 to air inlet manifolds 20 and 22. As already pointed out some of the gases may be passed to air inlet manifold 32.

In this way the amount of air or oxygen supplied to the chamber may be controlled. The valves 26 in air inlets 24 are regulated to control the amount of outside or fresh air fed to the chamber. This outside air is admixed with the oxygen depleted air supplied through conduits 100 and 102 and passed into chamber 10 among the agglomerates. The rate at which the mixture of gases is fed to the chamber is also controlled by the rate at which fan 96 is rotated. This in turn exerts some control of the rate at which spent gases escape from the top and bottom of the chamber.

It will thus be seen that the operator has a number of controls available to him with which he can govern generally the composition of the gases in the chamber. In this way local overheating of the agglomerates can be inhibited. Stated another way, the operator has some valuable controls over the rate at which the chemical reactions take place during the hardening operation.

It will be clear to those skilled in the art that the practice of the invention lends itself to a number of useful modifications. Thus, in Example 1 the apparatus is provided with only four outside (no inside) air inlet manifolds; and in Example 2 the apparatus is provided with the same number of outside manifolds supplemented by one inside manifold. Any suitable number of inside and outside manifolds may be employed, depending upon the nature of the operation to be conducted.

We claim:

1. In the method of producing hardened agglomerates from green moisture-bearing agglomerates formed of finely divided metal sulphides containing a substantial amount of pyrrhotite, the improvement which comprises:
   (a) establishing an upright column of the agglomerates in a heat treatment zone;
   (b) feeding the green moisture-bearing agglomerates at a predetermined rate to the top of the column;
   (c) passing a free-oxygen-bearing gas through the column of agglomerates;
   (d) setting up an exothermic reaction between the oxygen of the gas and the moisture and the pyrrhotite of the agglomerates to produce in situ solid oxidation products including oxides and sulphates and elemental sulphur and gaseous oxidation products including sulphur dioxide and sulphur trioxide and to deplete the gas in oxygen;
   (e) forming the solid oxidation products on the surfaces of the sulphide particles;
   (f) depositing the gaseous oxidation products for the greater part on the green agglomerates in the upper part of the column;
   (g) said solid and gaseous oxidation products forming intergranular binders on the surfaces of the sulphide particles;
   (h) controlling the extent of the exothermic reaction to maintain the temperature of the column well below that at which incandescence begins by limiting the amount of free oxygen admitted to the column;
   (i) maintaining the temperature of the column well below that at which incandescence begins but above that at which moisture is vaporized to prevent sintering together and roasting of, and to retain hydrated sulphates on and within, the agglomerates;
   (j) vaporizing moisture from the agglomerates to mingle with the oxygen-depleted gas and to form a wet gas thereby;
   (k) separating wet gas from the agglomerates;
   (l) permitting the agglomerates in the column to descend by gravity through the heat treatment zone; and
   (m) withdrawing hardened agglomerates from the bottom of the column substantially as fast as the green agglomerates are fed to the column.

2. Method according to claim 1 in which the free-oxygen-bearing gas is passed upwardly counter-currently to the descending agglomerates.

3. Method according to claim 1 in which a portion of the free-oxygen-bearing gas is passed downwardly concurrently with the column of descending agglomerates to prevent overheating and roasting due to inadvertent entry of air into the bottom of the column.

4. Method according to claim 1 in which wet gas is withdrawn from the upper portion of the column; the wet gas is treated for separation of water vapor; the treated gas is mixed with air to form a free-oxygen-bearing gas having an oxygen content less than that of air; and the resulting gas mixture is introduced into the column of agglomerates to inhibit localized overheating of the agglomerates.

References Cited in the file of this patent

UNITED STATES PATENTS

| | | |
|---|---|---|
| 899,219 | Johansson | Sept. 22, 1908 |
| 1,317,603 | Steiger | Sept. 30, 1919 |
| 1,460,067 | Laird | June 26, 1923 |
| 1,744,867 | Coolbaugh et al. | Jan. 28, 1930 |
| 1,912,621 | Clark | June 6, 1933 |
| 2,530,077 | Ramsing | Nov. 14, 1950 |
| 2,533,142 | Royster | Dec. 5, 1950 |
| 2,671,765 | McGrath et al. | Mar. 9, 1954 |
| 2,711,952 | West et al. | June 28, 1955 |
| 2,756,986 | Schytil et al. | July 31, 1956 |
| 2,772,958 | Beggs et al. | Dec. 4, 1956 |
| 2,813,016 | Thornhill | Nov. 12, 1957 |
| 3,027,251 | Schaefer et al. | Mar. 27, 1962 |

UNITED STATES PATENT OFFICE
CERTIFICATE OF CORRECTION

Patent No. 3,158,463                             November 24, 1964

Frank Petkovich et al.

It is hereby certified that error appears in the above numbered patent requiring correction and that the said Letters Patent should read as corrected below.

Column 6, lines 1 and 2, for "250° C." read -- 25° C. --.

Signed and sealed this 20th day of April 1965.

(SEAL)
Attest:

ERNEST W. SWIDER
Attesting Officer

EDWARD J. BRENNER
Commissioner of Patents